United States Patent [19]
Sakashita et al.

[11] Patent Number: 5,268,609
[45] Date of Patent: Dec. 7, 1993

[54] ARMATURE CORE WIRE WINDING METHOD

[75] Inventors: Hiroshi Sakashita; Eiji Arasaki, both of Komagane, Japan

[73] Assignee: Sankyo Seiki Mfg. Co., Ltd., Nagano, Japan

[21] Appl. No.: 843,915

[22] Filed: Feb. 27, 1992

[30] Foreign Application Priority Data

Mar. 1, 1991 [JP] Japan ................................. 3-61204

[51] Int. Cl.⁵ ..................... H01B 11/04; H01B 11/08; H01B 13/00; H02K 1/00
[52] U.S. Cl. .................................. 310/179; 242/7.03; 310/132
[58] Field of Search ............ 242/7.03, 7.05 R, 7.05 B; 310/132, 133, 134, 179, 180, 184, 185, 189, 198, 200–208, 269

[56] References Cited

U.S. PATENT DOCUMENTS

| | | | |
|---|---|---|---|
| 4,563,606 | 1/1986 | Fukasawa et al. | 310/179 X |
| 4,918,347 | 4/1990 | Takaba | 310/179 |
| 4,983,867 | 1/1991 | Sakamoto | 310/179 X |

Primary Examiner—Steven L. Stephan
Assistant Examiner—E. To
Attorney, Agent, or Firm—McAulay Fisher Nissen Goldberg & Kiel

[57] ABSTRACT

An armature core wire winding method in which the armature core has salient poles set to be an integral multiple number of three, the salient poles protruded radially from an axial core portion of the armature core, the method comprises the steps of; winding three wires in two stages around three salient poles, respectively, the three salient poles being included in a first block; drawing out three transition wires from the three salient poles of the first block, respectively, in such a manner that each transition wire is drawn out at one surface side of the salient poles; extending the transition wires in such a manner that the transition wires pass over two adjoining the salient poles; winding the transition wires around salient poles of a second block, respectively, each salient pole of the second block corresponding to each salient pole of the first block; and repeating the winding, drawing out, extending and the winding steps until the transition wires completely wind around the salient poles.

12 Claims, 8 Drawing Sheets

ARMATURE CORE WIRE WINDING METHOD

BACKGROUND OF THE INVENTION

1. Field of the Invention

The present invention relates to an armature core wire winding method in which the winding operation of wires to be simultaneously wound around a plurality of salient poles forming a block is performed successively in each block.

2. Background Art

Generally, in a rotating electric machine having a multipolar core or a similar machine, wires are wound in line by a nozzle-type winding machine. In particular, a large number of salient poles are divided into a plurality of blocks and, afterwards, the wire winding is carried out in each block.

For example, in an armature core 1 having three phases comprising a U phase, a V phase and a W phase as shown in FIGS. 11 and 12, a large number of salient poles 3 protrude radially from the outer peripheral surfaces of an axial core portion 2. The number of these salient poles are set to be an integral multiple of 3 and three mutually adjoining salient poles form a block. When the wires are actually wound around the respective salient poles 3, three wires 4, 5 and 6 are wound simultaneously around the respective salient poles U1, V1 and W1 in a block 3a. The winding of the wires around the respective salient poles 3 is performed, for example, in two stages, and the wires are wound to a height which corresponds to the stages of the winding.

After completion of the winding, transition wires 4a, 5a and 6a are drawn out from the respective salient poles U1, V1 and W1 in the above-mentioned first block 3a, going to the salient poles of a second block 3b, respectively. In particular, these transition wires 4a, 5a and 6a are placed in line on the upper surface (the right surface in FIG. 12) of the core. The transition wires 4a, 5a and 6a from the respective salient poles U1, V1 and W1 are passed over the upper surfaces of the two adjoining salient poles and are guided to their corresponding salient poles U2, V2 and W2 in the next or second block 3b, so that the wire winding can be performed. Thereafter, transition wires 4b, 5b and 6b are drawn out from the respective salient poles U2, V2 and W2 of the second block 3b toward the core upper surface (the right surface in FIG. 12). By repeating these winding operations, the winding of the wires around the 3-phase armature core 1 can be completed.

However, in the above-mentioned conventional wire winding method, the respective transition wires (4a, 5a, 6a,—) of the wires 4, 5 and 6 in the above-mentioned three systems, especially as shown in FIG. 12, are superimposed on another in three stages. The height of the three-stage superimposed transition wires is greater than the height of the two-stage superimposed wires wound around the respective salient poles 3. In other words, according to the conventional wire winding method, because the transition wires of the wires 4 intersect with one another at many points, the thickness of the whole wired core is great. This causes a problem in producing rotating electric machine in a thinner configuration.

SUMMARY OF THE INVENTION

It is an object of the invention to provide an armature core wire winding method which provides the capability of winding wires properly without intersecting the transition wires of core wires with one another so as to obtain a thin, rotating electric machine.

In order to achieve the above object, according to the invention, there is provided an armature core wire winding method in which, after wires are wound in two stages around three salient poles forming a block, among an integral multiple number of salient poles protruded radially from the outer peripheral surfaces of a cylindrical axial core portion, from the respective salient poles of the first block, there are drawn out transition wires in such a manner that they are put in line on the one-side surfaces of the respective salient poles, the transition lines are passed over and extended around the two adjoining salient poles. The wires are then wound around the corresponding salient poles in the next or second block, and the above operations are performed repeatedly, wherein when extending the respective transition wires drawn out from the respective salient poles in a block, among three systems of transition wires going from the salient poles in one block toward the salient poles in the other block, only the two systems of transition wires are made to intersect with one another and the remaining system of transition wires are disposed on the opposite side surfaces to the intersecting side surfaces.

For a better understanding of the present invention, reference is made to the following description and accompanying drawings while the scope of the invention will be pointed out in the appended claims.

DETAILED DESCRIPTION OF THE PREFERRED EMBODIMENTS

Description will hereinafter be provided in detail of the embodiments of an armature core wire winding method according to the present invention with reference to the accompanying drawings.

Figure 1:
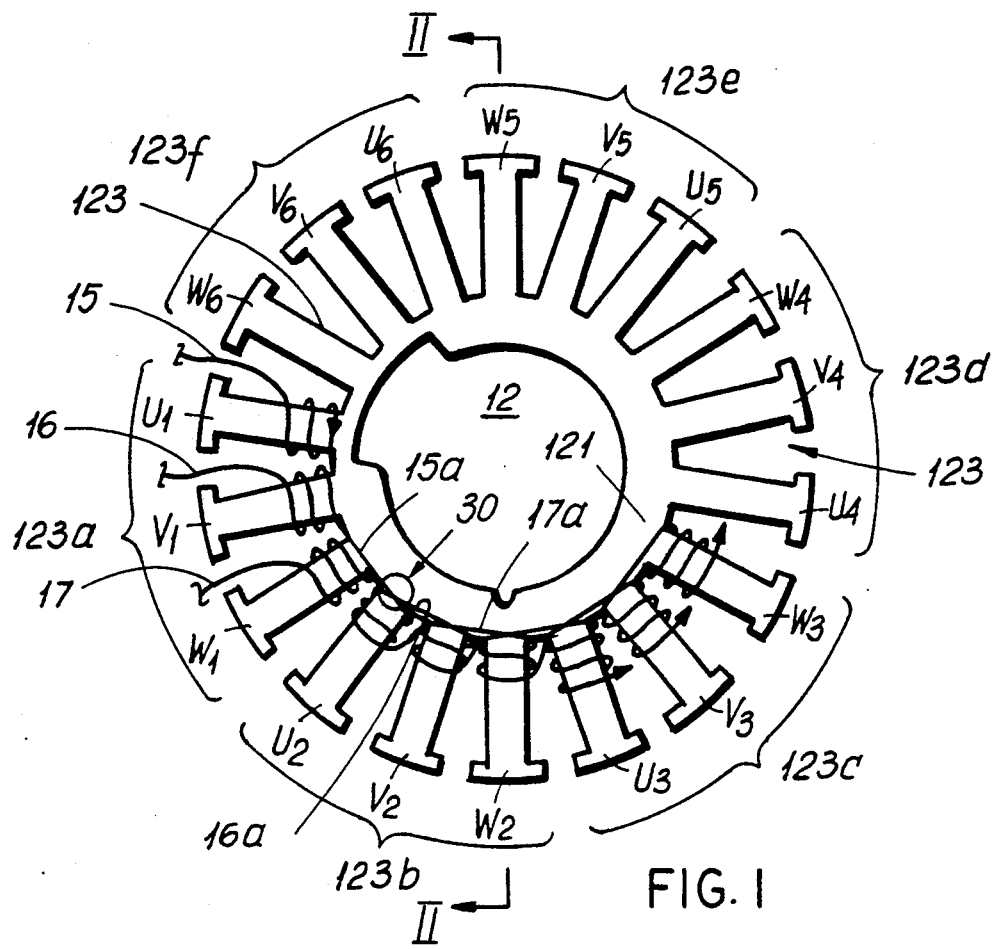
FIG. 1 is an explanatory, plan view of an armature core in a first embodiment of the invention.
Figure 2:
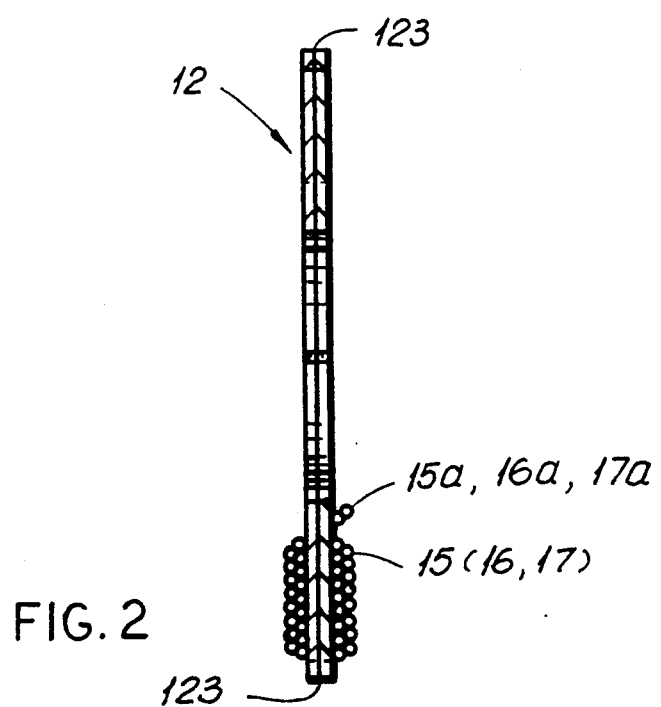
FIG. 2 is a transverse section view taken along the line II—II in FIG. 1.
Figure 3:
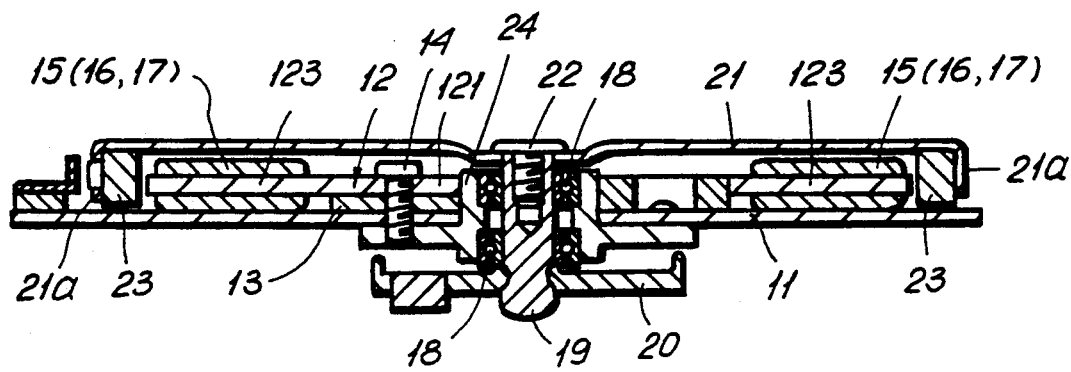
FIG. 3 is an explanatory, transverse sectional view of a spindle motor as an example of a rotary electric machines to which the present invention is applied.

In FIG. 3, there is shown an example of a spindle motor to which the present invention is applied. At first, on the upper surface side of a substrate 11 in FIG. 3, an armature core 12 to be discussed later is fixed through a spacer 13 by a screw 14. The armature core 12, as shown in FIGS. 1 and 2, can be produced by putting two core materials on each other and then applying an insulation coating thereto from above. The armature core 12 includes a cylindrical axial core portion 121 forming a central portion thereof and an integral multiple number of 3, in this case, 18 pieces of salient poles 123, 123,—which protrude radially from the outer peripheral surfaces of the cylindrical axial core portion 121. Three systems of wires 15, 16 and 17 are wound around the respective salient poles 123 in a method to be discussed later.

Referring back to FIG. 3, the axial core portion 121 of the above-mentioned armature core 12 is fitted to the outer peripheral portion of a hollow cylindrical bearing holder 24. A rotary shaft 19 is supported by means of a pair of bearings 18 and 18 in the interiors of the bearing holder 24. A disc-shaped spindle hub 20 is fixed to the output side (which is the lower end side in FIG. 3) of the rotary shaft 19 and a plate-shaped rotor case 21 is fixed to the base side portion (which is the upper end side portion in FIG. 3) of the rotary shaft 19 by a screw 22. A ring-shaped magnet 23 is disposed in the outer peripheral side portion or flange portion 21a of the rotor case 21 in such a manner that it faces the outside portion of the wires 15 (16, 17) of the above-mentioned armature core 12.

As shown in FIG. 1, description will now be presented of a first embodiment of the present method for winding the wires 15, 16 and 17 around the respective salient poles of the above-mentioned armature core 12. At first, referring to the above-mentioned salient poles 123, three mutually adjoining salient poles form a block. That is, a total of six blocks 123a, 123b, 123c—, 123f are set in this manner. When winding the wires 15, 16 and 17 around the respective salient poles 123, three wire nozzles are used to wind wires firstly around the respective salient poles U1, V1 and W1 in the first block 123a simultaneously. After that, the wire windings are performed successively in the order of the second block 123b, third block 123c,—. The winding of the wires 15, 16 and 17 in the respective blocks is performed in two stages while the three wire nozzles are being moved simultaneously. In other words, at first the first-stage winding is carried out for 43 turns, for example, from the inside of the salient poles to the outside thereof and, after that, the second-stage winding is executed for 43 turns in return. This wire winding is performed without producing any clearances and overlaps between the wires.

After completion of the above-mentioned wire winding in the first block 123a, transition wires 15a, 16a and 17a are respectively drawn out from the respective salient poles U1, V1 and W1 of the first block 123a toward the next or second block 123b. The drawing-out of the transition wires 15a, 16a and 17a is performed in such a manner that they are put in line on the upper side surface (the right surface in FIG. 2) of the core.

Figure 4:
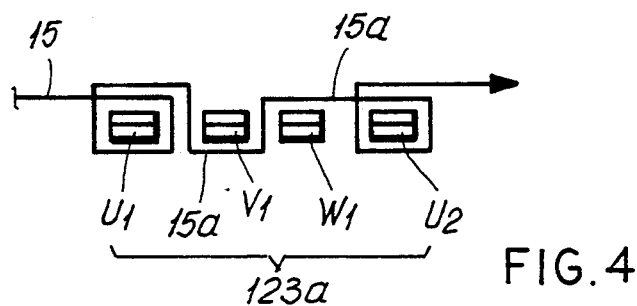
FIG. 4 is a sectional, schematic-type view showing an embodiment of the present invention.

Prior to description of the following wire winding step, description will be first presented of the system of the transition wire 15a of the above-mentioned three systems of transition wires 15a, 16a and 17a. As shown in FIG. 4 as well, the transition wire 15a, which is drawn out from the salient pole U1 of the first block 123a with the wires completely wound therearound toward the upper side (the right side in FIG. 2) of the core, is extended in such a manner that it is passed over salient pole V1 adjoining the salient pole U1 and over the salient pole adjoining the pole V1 and is then guided to the corresponding salient pole U2 in the next or second block 123b. In this case, with respect to the salient pole V1, the transition wire 15a is extended on the lower surface side thereof which is opposite to the drawing-out side surface of the transition wire, 15a. Also, with respect to the salient pole W adjoining the pole V1, the transition wire 15a is extended on the upper surface side which is the drawing-out side surface of the transition wire 15a, and is guided from the upper surface side to the corresponding salient pole U2 in the second block 13b. Then, similar to the above case, the wire can be wound around the salient pole U2.

The remaining two systems of transition wires 16a and 17a are wound similarly. In other words, the transition wires 16a and 17a, which are respectively drawn out to the upper side (or the right side in FIG. 2) of the core from the respective salient poles V1 and W1 with the wires completely wound therearound, are passed over the salient poles W1 and U2 respectively adjoining the relevant salient poles V1 and W1 and over the salient poles U2 and V2 respectively adjoining the poles W1 and U2 and are then guided to the corresponding salient poles V2 and W2 in the next block 123b, respectively. In this case, with respect to the salient poles W1 and U2, the transition wires 16a and 17a are extended on the lower surface sides which are opposite to the drawing-out side surface of the transition wires 16a and 17a, respectively. Also, with respect to the next salient poles U2 and V2 respectively adjoining the salient poles W1 and U2, the transition wires 16a and 17a are again extended on the upper surface sides which are the drawing-out side surfaces of the transition wires 16a and 17a, respectively, and are then guided from the upper surface sides to the corresponding salient poles V2 and W2 in the next or second block 123b, respectively. Then, the wires are wound around the salient poles V2 and W2 similarly as with respect to the above-mentioned salient pole U2. By repeating these winding operations, the winding of the wires around the armature core 11 having three phases including a U phase, a V phase and a W phase can be completed.

According to the first embodiment of the present invention, when the three systems of transition wires 15a, 16a and 17a are respectively extended from the respective salient poles U1, V1 and W1 in the first block 123a toward the respective salient poles U2, V2 and W2 in the adjoining second block 123b, only two of the above-mentioned three systems of transition wires are made to intersect with each other, for example, on the upper surface side of the core shown by a circle 30 in FIG 1. The remaining system of transition wire is disposed on the lower side surface which is opposite to the above intersecting side. That is, in the present embodiment, the respective transition wires are lapped on each other in two states similarly to the wires wound around the salient poles and, therefore, the height of the transition wires does not exceed that of the wires wound around the salient poles.

Figure 6:
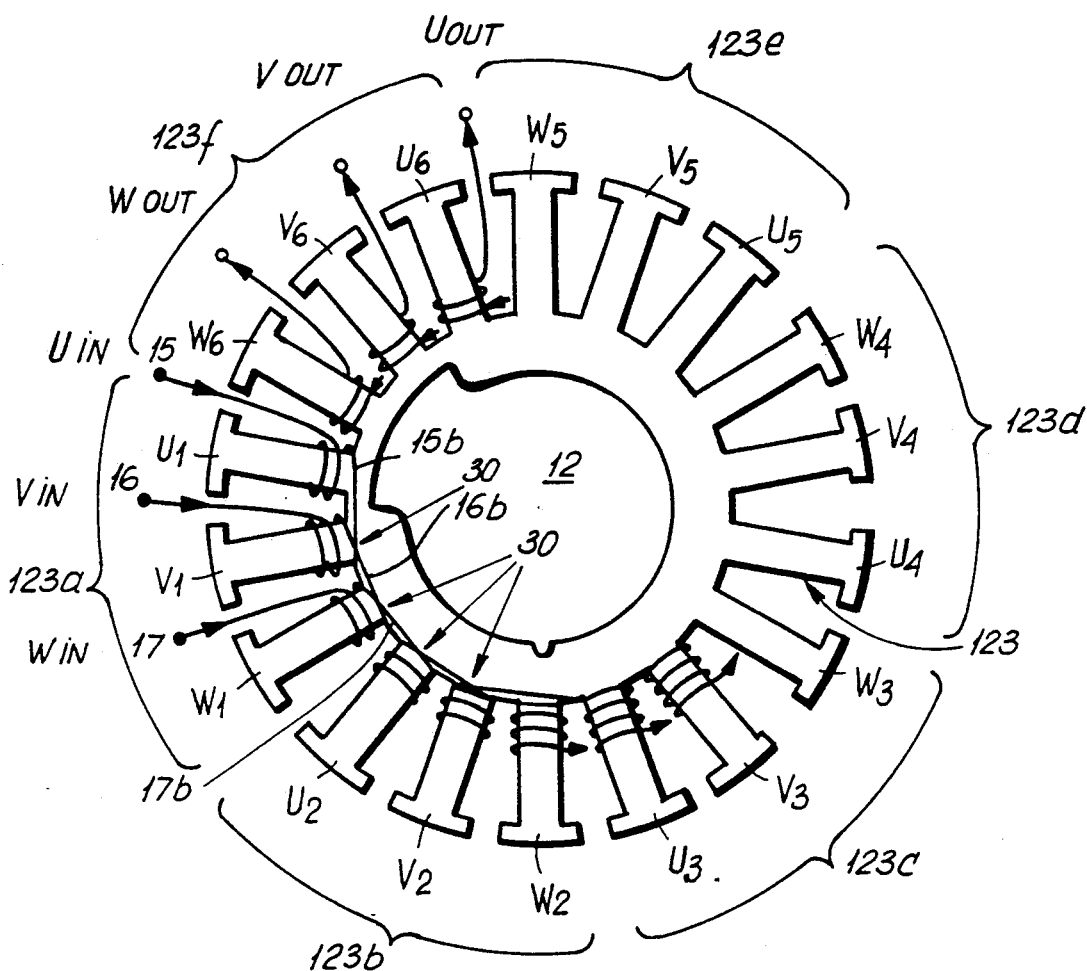
FIG. 6 is an explanatory plan view of an armature core in a second embodiment of the present invention.

Next, description will be presented regarding a second embodiment of the invention for winding wires 15, 16 and 17 around the respective salient pole 123 of the above armature core 12 by way of FIG. 6. In the second embodiment, the block structure of the salient poles 123 and the winding of the wires 15, 16 and 17 around the respective salient poles 123 are the same as in the first embodiment and thus the description thereof is omitted here.

After completion of the wire winding in the above first block 123a, transition wires 15b, 16b and 17b are respectively drawn out from the respective salient poles U1, V1 and W1 toward the next or second block 123b. The drawing-out of the transition wires 15b, 16b and 17b is performed so that they are put in line on the upper surface (that is, the right surface in FIG. 2) of the core.

Figure 5:
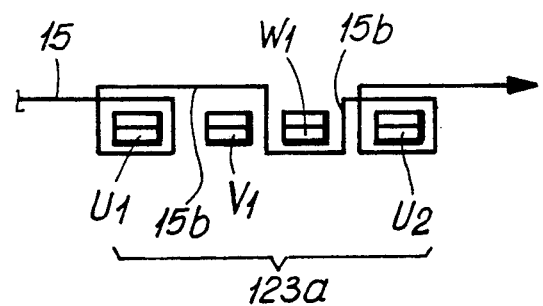
FIG. 5 is a sectional, schematic-type view showing another aspect of the present invention.

Prior to the description of the following wire winding step, description will be first presented of the system of the transition wire 15b among the above-mentioned three systems of transition wires 15b, 16b and 17b. As shown in FIG. 5 as well, is, the right side in FIG. 2) from the salient pole U1 of the first block 123a with the wire completely wound therearound is extended in such a manner that it is passed over the salient pole V1 adjoining the relevant salient pole U1 and over the salient pole W1 adjoining the salient pole V1 and is then guided to the corresponding salient pole U2 in the next or second block 123b. In this case, with respect to the salient pole V1, the transition wire 15b is extended on the upper surface side which is the drawing-out side surface of the transition wire 15b. Also, with respect to the salient pole W1 adjoining the pole V1, the transition wire 15b is extended on the lower surface side which is opposite to the drawing-out side of the transition wire 15b and is then guided from the upper surface side to the corresponding salient pole U2 in the second block 123b. Then, the wire is wound around the salient pole U2 similar to the above case described above.

Also, the other two systems of transition wires 16b and 17b are similarly wound. In particular, the transition wires 16b and 17b respectively drawn out toward the upper side (that is the right side in FIG. 2) from the respective salient poles V1 and W1 with the wires completely wound therearound are passed over the salient poles W1 and U2, and are then guided to the corresponding salient pole V2 and W2 in the next or second block 123b respectively. In this case, with respect to the salient poles W1 and U2, the transition wires 16b and 17b are extended or led on the upper surface side of the drawing-out side surface of the transition wires 16b and 17b. Also, with respect to the next salient poles U2 and V2 respectively adjoining the salient poles W1 and U2, the transition wires 16 and 17b are extended again on the lower surface side which is opposite to the drawing-out side surface, and are then guided from the upper surface side toward the corresponding salient poles V2 and W2 in the next or second block 123b. Then, the wires are wound around the salient poles V2 and W2 similarly. By repeating these operations, the winding of the wires around the armature core 11 having three phases including U, V and W phases can be completed.

Figure 7:
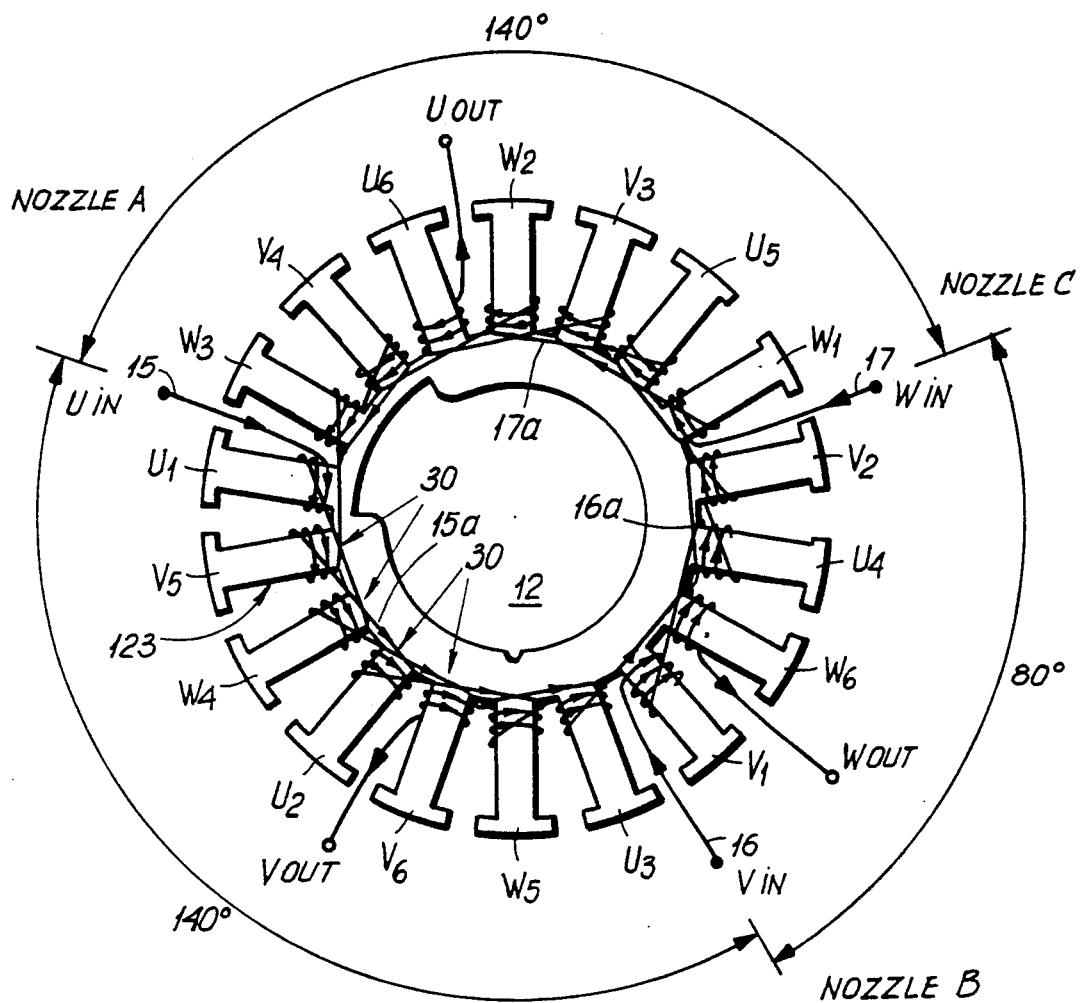
FIG. 7 is an explanatory plan view of an armature core in a third embodiment of the present invention.

Next, description will be presented of a third embodiment of the invention for winding wires 15, 16 and 17 around the respective salient pole 123 of the above armature core 12 used in the spindle motor in FIG. 3. At first, referring to the respective salient poles 123, as shown in FIG. 7, a block comprising three salient poles U1, V1 and W1 which are disposed separated in position and a total of 6 blocks U1, V1, W1, U2, V2, W2 U6, V6, W6 are provided and three nozzles A, B, C are arranged so as to correspond to the pole position which windings at first in FIG. 7 are respectively set as the mounting positions of the three nozzles. The nozzle A is mounted in front of the pole U1, the nozzle B is mounted in front of the pole V1, the nozzle C is mounted in front of the pole W1. It seems that a trisection of 360° is 120°. However, in fact, as can be clearly understood from FIG. 7, the trisection varies according to the number of salient poles provided in a motor and, for this reason, the trisections are not equal to one another, that is, they are not each 120° equally. For example, in a motor which is used in the present invention, 18 salient poles are used and thus, at such angles as shown in FIG. 7, the salient poles are mounted at such positions (angles) that wires can be wound around a salient pole U1 corresponding to the U phase, a salient pole V1 corresponding to the V phase and a salient pole W1 corresponding to the W phase, and three nozzles A, B, C are mounted at proper angular positions.

The three nozzles are mounted at such positions (angles) that the wires can be wound around the salient pole U1 corresponding to the U phase, the salient pole V1 corresponding to the V phase and the salient pole W1 corresponding to the W phase, in the ranges that satisfy the above-mentioned conditions, and wires are then wound sequentially.

Also, as shown in FIG. 7, in the respective U, V and W phases, the start position (for example, salient pole U1) of the wire winding and the end position (for example, salient pole U1) thereof are set so as to be adjoining each other. Further, when actually winding the wires 15, 16 and 17 around the respective salient poles 123, at first the wires are wound around the respective salient poles U1, V1 and W1 in the first block U1, V1, W1 simultaneously and the wire winding is then successively performed in the order of the following: second block U2, V2, W2; third block U3, V3, W3. The winding of the wire 15, 16 and 17 in the respective blocks is carried out in two stages while three wire nozzles are being moved simultaneously. That is, at first in the first stage, the winding is executed 43 turns, for example, from the inside of the salient pole toward the outside thereof and, after that, in the second state, the winding is carried out 43 turns in return. In this case, the wire winding can be performed without producing any clearances and overlaps between the wires.

After completion of the wire winding in the above first block U1, V1, W1, transition wires 15a, 16a and 17a are drawn out respectively from the respective salient pole U1, V1 and W1 of the first block U1, V1, W1 toward the next or second block U2, V2, W2. The drawing-out of the transition wires 15a, 16a, 17a is performed in such a manner that they are put in line on the upper surface (that is, the right surface in FIG. 2) of the core.

Now, prior to the description of the following wire winding step, at first description will be presented of the system of the transition wire 15a, 16a and 17a. As shown in FIG 4 as well, the transition wire drawn out toward the upper side (that is, the right side in FIG. 2) of the core from the salient pole U1 of the first block U1, V1, W1 with the wires completely wound therearound is led or extended in such a manner that it is passed over a salient pole V5 adjoining the relevant salient pole U1 and over a salient pole W4 adjoining the salient pole V5 and is then guided to the corresponding salient pole U2 of the next or second block U2, V2, W2. In this case, with respect to the salient pole V5, the transition wire 15a is extended on the lower surface side which is opposite to the drawing-out side surface of the transition wire 15a. Also, with respect to a salient pole W5 adjoining the salient pole V5, the transition wire 15a is extended on the upper surface side which is the drawing-out surface of the transition wire 15a and is then guided from the upper surface side to the corresponding salient pole U2 of the second block U2, V2, W2. Then, the wire is wound around the salient pole U2 similar to the above-mentioned case.

Also, the other two systems of transition wires 16a and 17a are also treated similarly to that of the transition wire 15a. In other words, the transition wires 16a and 17a respectively drawn out toward the upper side (that is, the right side in FIG. 2) of the core from the respective salient poles V and W1 with the wires completely wound therearound are passed over salient pole W6 and U5 respectively adjoining the relevant salient poles V1 and W2 as well as over salient poles U4 and V3 respectively adjoining the salient poles W6 and U5, and are then guided to the corresponding salient poles V2 and W2 of the second block U2, V2, W2. In this case, with respect to the salient poles W6 and U5, the transition wires 16a and 17a are extended on the lower surface side which is opposite to the drawing-out side surface of the transition wires 16a and 17a. Also, with respect to the salient poles U4 and V3 respectively adjoining the salient poles W6 and U5, the transition wires 16a and 17a are respectively extended again on the upper surface side which is the drawing-out side of the transition wires 16a and 17a, and are then guided to the corresponding salient V2 and W2 of the second block U2, V2, W2, respectively. Then, the wires are similarly wound around the salient poles V2 and W2. By performing these operations repeatedly, the winding of the wires around the armature core 11 having three phases including U, V and W phases can be completed.

Now, description will be presented of a fourth embodiment of the invention for winding a wire 15 (16, 17) around the respective salient poles 123 of an armature core 12 used in a spindle motor shown in FIG. 3.

In this fourth embodiment, the wires are not wound simultaneously by use of the three nozzles as in the above-mentioned embodiment, but a single nozzle is used to wind a wire around all salient poles provided in the armature core 12, one by one, in such a manner that the salient poles belonging to the same specified phase of U, V and W phases forming the three systems of armature core can correspond to the same specified phase.

Figure 8:
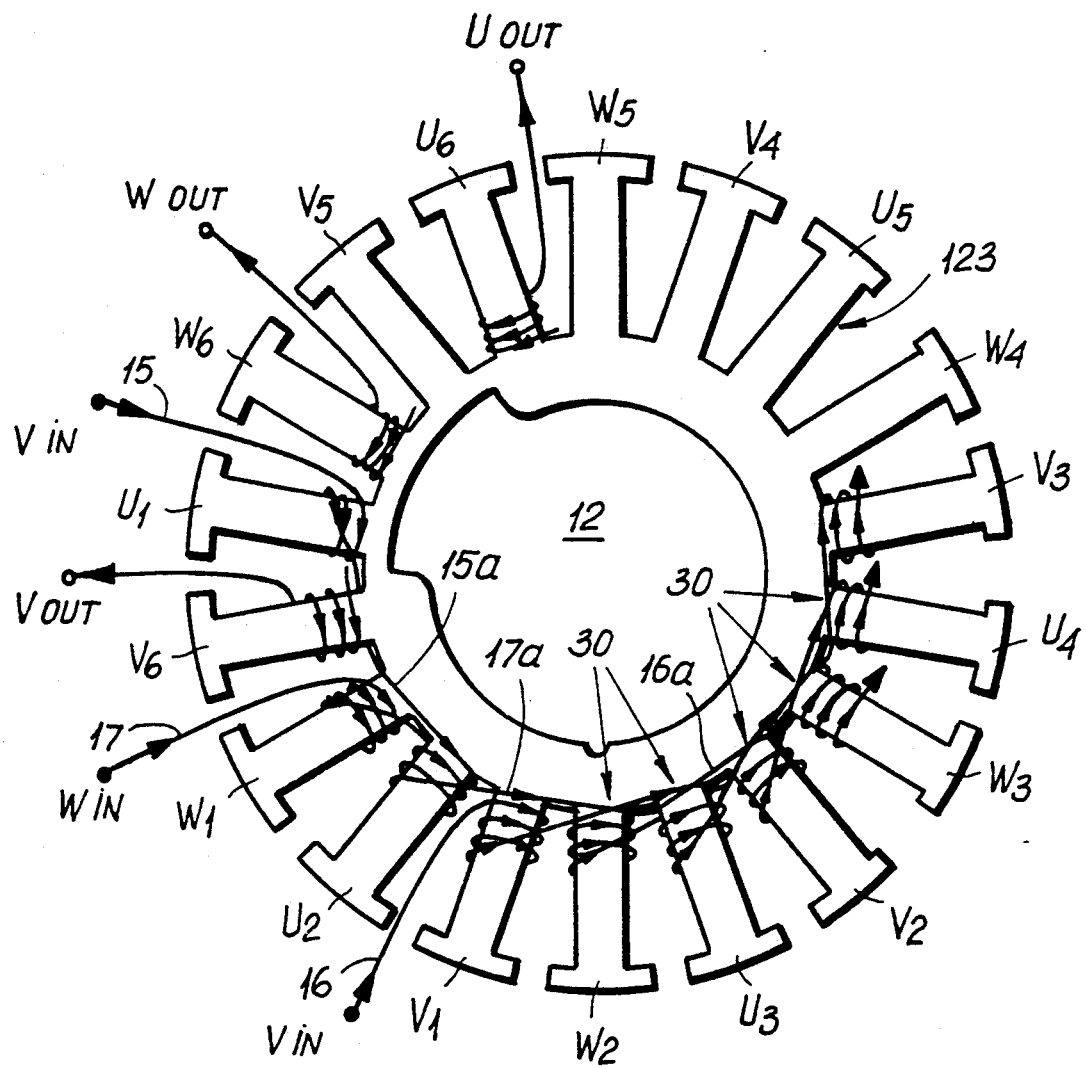
FIG. 8 is an explanatory plan view of an armature core to a fourth embodiment of the present invention.

Referring firstly to the above-mentioned salient poles 123, a block is composed of three salient poles, U1, V1 and W1 which correspond to the same specified phase of the U, V and W phases forming the three systems and in the salient poles 123, as shown in FIG. 8, there are set a total of 6 blocks U1, V1, W1, U2, V2, W2 ... U6, V6, W6.

When winding the wire 15 around the respective salient poles 123, a single wire nozzle is used to wind the wire 15 firstly around salient poles U1 to U6 corresponding to the U phase. That is, the wire winding is firstly performed around the salient pole U1 of the first block, and the wire winding is then performed successively around the salient pole in the order of the salient pole U2 of the second block,—, the salient pole U6 of the sixth block.

When the wire winding is completed with respect to all salient poles U1 to U6 corresponding to the U phase in this manner, a tapping operation is performed.

The tapping operation means that, between the end of the winding round the salient pole U6 corresponding to the U phase and the start of the winding around the salient pole V1 corresponding to the next V phase, a wire material for the wire 15 is held by another member to thereby slacken the wire material so as to secure a wire having a length required for soldering or common treatment.

It should be noted that a joined wire material may be cut to a necessary length in the step of the material being held by another member, or it may be cut to a necessary length when the winding of the wire around all salient poles of the U, V and W phases forming the three systems is completed.

Now, the tapped wire 15 is then wound around a salient pole V1 corresponding to the next or V phase in the first block. Similarly to the U phase, the winding of wire 15 is successively performed around the salient poles in the order of a salient pole V2 in the second block,—, and a salient pole V6 in the sixth block.

When the wire winding with respect to all salient poles V1 to V6 corresponding to the V phase is completed, as described above, the wire 15 is tapped again between the salient pole V6 and a salient pole W1 corresponding to the W phase.

Further, the wire 15 is wound successively around the salient poles corresponding to the W phase in the order of a salient pole W1 in the first block,—, a salient pole W6 in the sixth block.

Here, the winding of the wire around the respective salient poles, similar to the above-mentioned embodiments, is performed in such a manner that the first stage winding is carried out 43 turns, for example, from the inside of the salient pole toward the outside thereof and after that the second state winding is carried out 43 turns from the outside toward the inside. In this case, the wire winding is performed without producing any clearances and overlapping between the wires.

As described above, in the winding of the wire around the salient poles corresponding to the same specified phase, after completion of the winding of the wire around one of the salient poles, a transition wire 15a is drawn out from the salient pole with the wire completely wound therearound toward the next salient pole corresponding to the same specified phase.

After the winding around the salient pole U1 in the first block U1, V1, W1 is completed, the transition wire 15a is drawn out from the salient pole U1 toward a salient pole in the next or second block. The drawing-out of the transition wire 15a is performed on the upper surface (that is, the right surface in FIG. 2) of the core.

In the next wire winding step, as shown in FIG. 4 as well, the transition wire 15a drawn out toward the upper side (that is, the right side FIG. 2) of the core from the salient pole U1 of the first block U1, V1, W1 with the wire completely wound therearound, as shown in FIG. 8, is extended in such a manner that it is passed over a salient pole W1 adjoining the pole V6 and is then guided to a salient pole U2 corresponding to the U phase in the next or second block U2, V2, W2. In this case, with respect to the salient pole V6, the transition wire 15a is extended on the lower surface side which is opposite to the drawing-out side surface of the relevant transition wire 15a. Also, with respect to the next salient pole W1 adjoining the salient pole V6, the transition wire 15a is extended again on the upper surface side which is the drawing-out side surface of the transition wire 15a, and is then guided from the upper surface side to a salient pole U2 corresponding to the U phase in the second block 123b. Then, the wire 15a is wound around the salient pole U2 similar to the above-mentioned case.

Also, the other two transition wires 16a and 17a of the other two systems respectively forming the V and W phases are treated similarly to the above-mentioned transition wire 15a. In the fourth embodiment, a single nozzle is used to wind only the wire 15 around all salient poles of the armature core 12. Therefore, actually, the two transition wires 16a and 17a are the same as the transition wire 15a. That is, the terms "transition wires 16a and 17a" are used only the purpose of explanation.

Further, in the fourth embodiment, the winding start positions for the U, V and W phases can be set arbitrarily.

Figure 9:
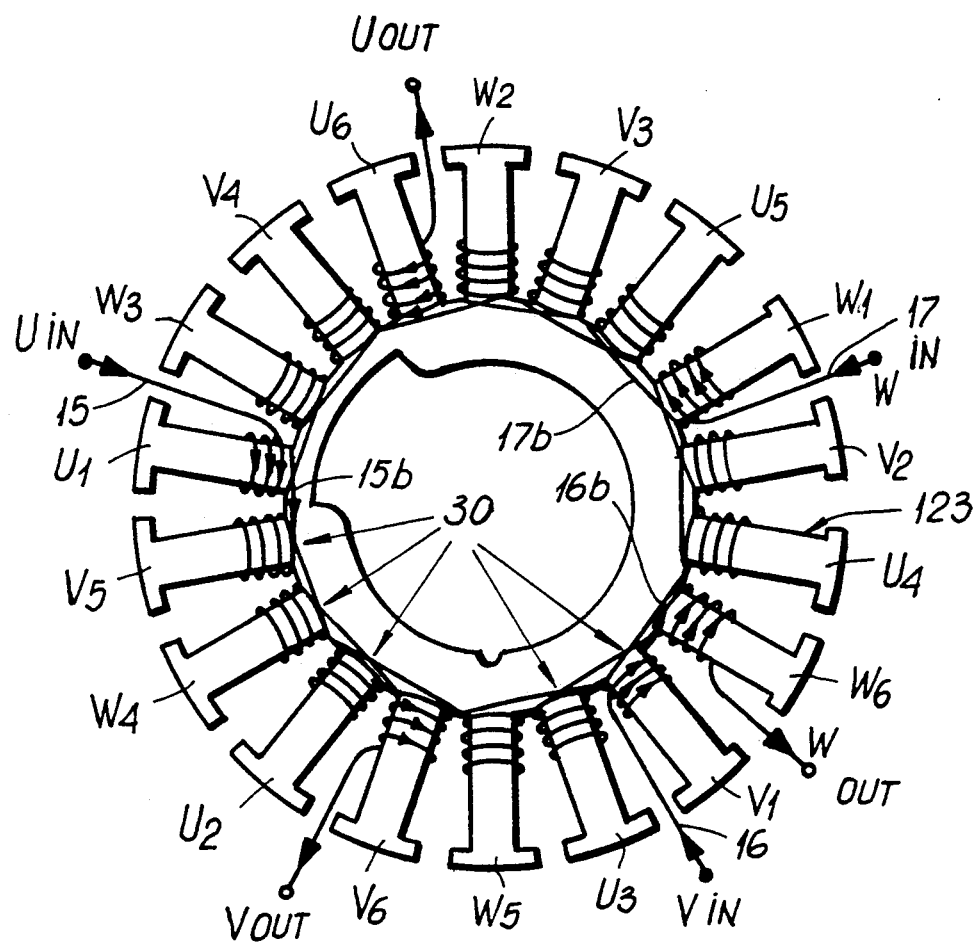
FIG. 9 is an explanatory plan view of an armature core a fifth embodiment of the present invention.

Next, description will be given below of a fifth embodiment of the invention for winding wires 15, 16 and 17 around the respective salient poles 123 of the above armature coil 12 with reference to FIG. 9.

The block structure of the salient poles and the winding of the wires 15, 16 and 17 around the respective salient poles 123 are the same as in the third embodiment and thus the description thereof is omitted here.

After completion of the wire winding in the first block 123a, transition wires 15b, 16b and 17b are drawn out respectively from the respective salient poles U1, V1 and W1 of the first block U1, V1, W1 toward the second block U2, V2, W2. The drawing-out of the transition wires 15b, 16b and 17b is conducted in such a manner that they are put in line on the upper side surface (that is, the right surface in FIG. 2) of the core.

Prior to description of the next wire winding step, description will be given at first of the systems of the transition wire 15b out of the three systems of transition wires 15b, 16b and 17b. As shown in FIG. 5 as well, the transition wire 15b drawn out toward the upper side (that is, the right side in FIG. 2) from the salient pole U1 of the first block U1, V1, W1 with the wire completely wound therearound is extended in such a manner that it is passed over a salient pole V5 adjoining the relevant salient pole U1 and is then guided to a corresponding salient pole U2 in the second block U2, V2, W2. In this case, with respect to the salient pole V5, the transition wire 15b is extended on the upper surface side which is the drawing-out side surface of the relevant transition wire 15b. Also, with respect to the next salient pole W5 adjoining the salient pole V5, the transition wire 15b is extended on the lower surface side which is opposite to the drawing-out side surface of the transition wire 15b and is then guided from upper surface side to a corresponding salient pole U2 in the second block U2, V2, W2 from the upper surface side. Then, the wire is wound around the salient pole U2 similar to the above-mentioned case.

Also, the remaining two systems of transition wires 16b and 17b are wound similarly to the above-mentioned transition wire 15b. In particular, the transition wires 16b and 17b drawn out toward the upper side (that is, the right side in FIG. 2) respectively from the respective salient poles V1 and W1 with the wire completely wound therearound are passed over salient poles W6 and U5 respectively adjoining the relevant salient poles V1 and W1 and over salient poles U4 and V3 respectively adjoining the salient poles W6 and U5, and are then respectively guided to corresponding salient poles V2 and W2 in the next block U2, V2, W2. In this case, with respect to the salient poles W6 and U5, the transition wires 16b and 17b are respectively extended on the upper surface side which is the drawing-out side of the transition wires 16b and 17b. Also, with respect to the salient poles U2 and V2 respectively adjoining the salient poles W6 and U5, the transition wires 16b and 17b are respectively extended on the lower side surface which is opposite to the drawing-out side surface of the transition wires 16b and 17b, and are then respectively guided to corresponding salient poles V2 and W2 in the second block U2, V2, W2. Similarly, the wires are then wound around the salient poles V2 and W2. By performing these winding operations repeatedly, the wire winding of the armature core 11 having three phases including U, V and W phases can be completed.

Further, description will be given below of a sixth embodiment of a method for winding a wire 15 around the respective salient poles 123 of the above-mentioned armature core 12 according to the present invention.

In the sixth embodiment, similarly as is the fourth embodiment discussed above, the wires are not wound simultaneously by use of three nozzles but a single nozzle is used to wind the wire around all salient poles provided in the armature core 12 one by one in such a manner that the salient poles belonging to the same specified phase of U, V and W phases respectively forming three systems can correspond to the same specified phase.

Therefore, the block structure of the above-mentioned salient poles 123 and the winding of the wire 15 around the respective salient poles 123 are the same as those of the fourth embodiment and thus the description thereof is omitted here.

In the winding of the wire around the salient poles corresponding to the same specified phase, after completion of the winding of the wire around one salient poles, a transition wire 15b is drawn out from the salient pole with the wire completely wound therearound toward the next salient pole corresponding to the same specified phase.

After completion of winding of the wire around a salient pole U1 in the above-mentioned first block U1, V1, W1, the transition wire U1 is drawn out from the salient pole U1 toward a salient pole U2 in the next or second block. The drawing-out of the transition wire 15b is executed on the upper side surface (that is, the right side surface in FIG. 2) of the core.

Figure 10:
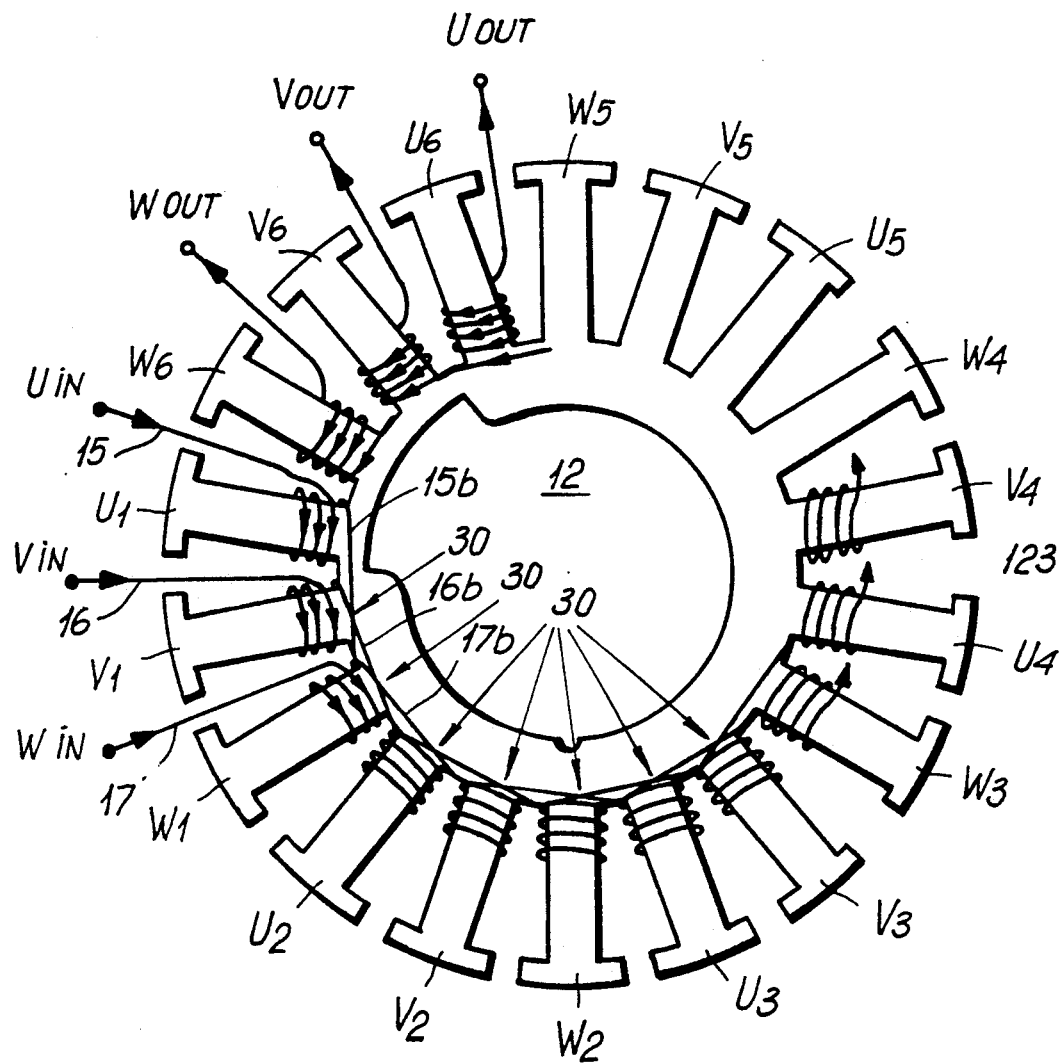
FIG. 10 is an explanatory plan view of an armature core in a sixth embodiment of the present invention.
Figure 11:
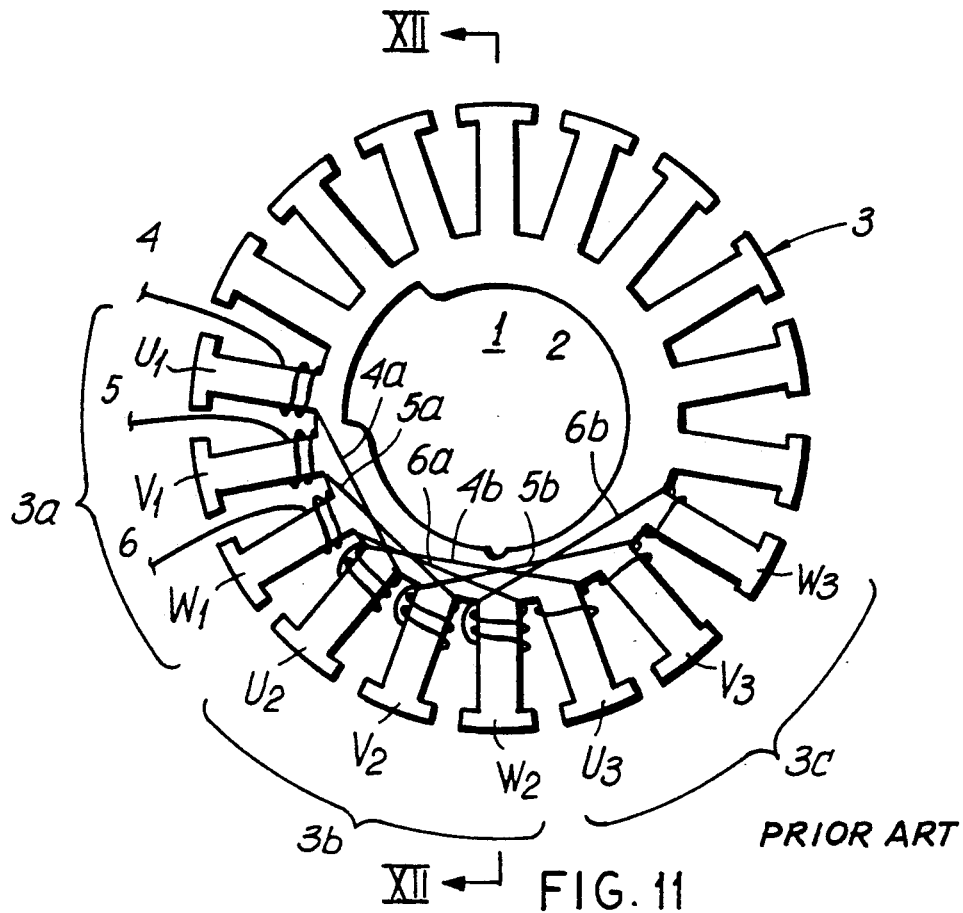
FIG. 11 is an explanatory plan view of an example of conventional armature cores.
Figure 12:
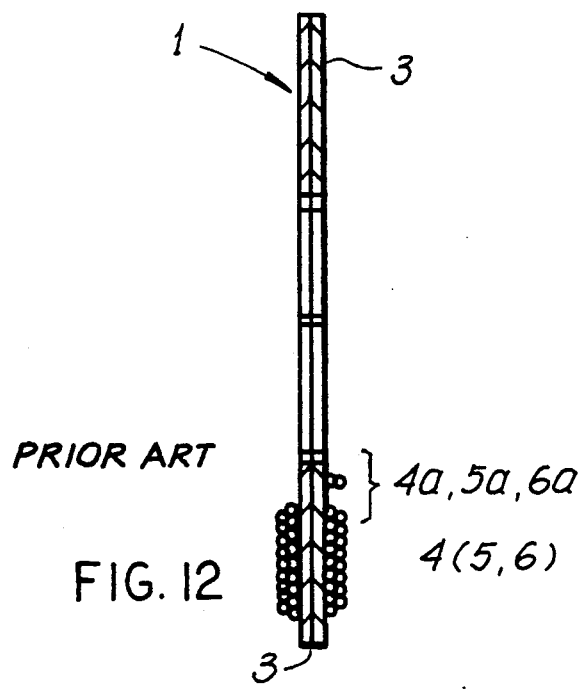
FIG. 12 is a transverse section view taken along the line VI—VI in FIG. 11.

In a wire winding step following the above operation, as shown in FIG. 4 as well, the transition wire 15b drawn out toward the upper side (that is, the right side in FIG. 2) from the salient pole U1 of the first block U1 V1 W1 with the wire completely wound therearound, as shown in FIG. 10, is extended in such a manner that it is passed over a salient pole V1 adjoining the relevant salient pole &1 and over a salient pole W1 adjoining the salient pole V6 and is then guided to a salient poles U2 corresponding to the U phase in the next or second block U2 V2 W2. In this case, with respect to the salient pole V6, the transition wire 15b is led or extended on the upper surface side which is the drawing-out side surface of the relevant transition wire 15b. Also, with respect to the salient pole W1 adjoining the salient pole V6, the transition wire 15a is extended on the lower surface side which is opposite to the drawing-out side surface of the transition wire 15a and is then guided from the upper surface side to a salient pole U2 which corresponds to the U phase in the second block U2 V2 W2.

The transition wires 16b and 17b of the remaining two systems respectively forming the V and W phases are also wound similarly. Specifically, in the sixth embodiment, a single nozzle is used to wind only the wire 15 around all salient poles of the armature core 12. Therefore, in fact, the transition wires 16b and 17b are the same as the transition wire 15b. That is, only for the purpose of explanation, the transition wires 16b and 17b are used.

In the sixth embodiment as well, the winding start positions of the U, V and W phases can be set arbitrarily.

In the above-mentioned description of the first to sixth embodiments, the direction of U phase→V phase→W phase→U phase—is assumed to be clockwise (CW). However, this is not meant to be limiting but the direction may be counterclockwise (CCW). In this case, the spindle motor may be rotated in the reversed direction.

As has been described heretofore, according to the invention, due to the fact that, out of three systems of transition wires respectively going from the salient poles of a block to the salient poles of another block, only the two systems of transition wires are made to intersect with each other while the remaining one system of the transition wire is extended on the opposite side of the core to the intersecting side thereof, the wire winding around the salient poles of the armature core can be performed properly without intersecting the transition wires of the core winding wires with one another at many points, so that a rotary electric machine of a reduced thickness can be provided.

While the foregoing description and drawings represent the preferred embodiments of the present invention, it will be obvious to those skilled in the art that various changes and modifications may be made therein without departing from the true spirit and scope of the present invention.

What is claimed is:

1. An armature core wire winding method in which an armature core has salient poles set to be an integral multiple number of three, said salient poles protruding radially from an axial core portion of said armature core, said method comprising the steps of:
    winding three wires in two stages around three salient poles, respectively, said three salient poles being included in a first block;
    drawing out three transition wires from said three salient poles of said first block, respectively, in such a manner that each transition wire is drawn out at one surface side of said salient poles;
    extending said transition wires in such a manner that said transition wires pass over two adjoining said salient poles;
    winding said transition wires around salient poles of a second block, respectively, each salient pole of said second block corresponding to each salient pole of said first block; and
    repeating said winding, drawing out, extending and winding steps until said transition wires are completely wound around said salient poles wherein when said three transition wires are drawn out from said three salient poles of said first block, respectively, two transition wires forwarded respectively from said salient poles of said first block toward said second block are made to intersect with each other with the other transition wire being positioned on a surface side opposite to the intersecting side surface.

2. An armature core wire winding method as claimed in claim 1, wherein said three transition wires are wound around said salient poles simultaneously.

3. An armature core wire winding method as claimed in claim 1, wherein said three salient poles are mutually adjoining.

4. An armature core wire winding method as claimed in claim 1, wherein when said three transition wires are drawn out from said three salient poles respectively, each of said transition wires being extended on an opposite surface to a drawing out surface side of said transition wires at a salient pole directly adjoining said salient pole having said wire completely wound around said salient pole, said transition wire being further extended on said drawing out surface at a salient pole adjoining said salient pole which directly adjoins said salient pole completely wound, and said transition wire being wound around a salient pole of said second block at said drawing out surface.

5. An armature core wire winding method as claimed in claim 1, wherein when said three transition wires are drawn out from said three salient poles, respectively, each of said transition wires being extended on a drawing out surface side of said transition wires at a salient pole directly adjoining said salient pole having said wire completely wound around said salient pole, said transition wire being further extended on an opposite surface to said drawing out surface at a salient pole adjoining said salient pole which directly adjoins said salient pole completely wound, and said transition wire being wound around a salient pole of said second block at said drawing out surface.

6. An armature core wiring method in which an armature core has salient poles set to be an integral multiple number of three, said salient poles protruding radially from an axial core portion of said armature core, said method comprising the steps of:
    winding three wires in two stages around thee salient poles, respectively, said three salient poles being included into a first block;
    said salient poles in the first block disposed substantially at respective trisections of 360°;
    drawing out three transition wires from said three salient poles of said first block, respectively, in such a manner that each transition wire is drawn out at one surface side of said salient poles;
    extending said transition wires in such a manner that said transition wires pass over two adjoining salient poles;
    winding said transition wires around salient poles of a second block, respectively, each salient pole of said second block corresponding to each salient pole of said first block; and
    repeating said winding, drawing out, extending and winding steps until said transition wires completely wind around said salient poles; wherein when said three transition wires respectively drawn out from said three salient pole, each of said transition wires being extended on an opposite surface to a drawing out surface side of said transition wires at a salient pole directly adjoining said salient pole having said wire completely wound around said salient pole, said transition wire being further extended on said drawing out surface at a salient pole adjoining said salient pole which directly adjoins said salient pole completely wound, and said transition wire being wound around a salient pole of said second block at said drawing out surface.

7. An armature core wire winding method as claimed in claim 6, wherein said three transition wires are wound around said salient poles, simultaneously.

8. An armature core wiring method in which an armature core has salient poles set to be an integral multiple number of three, said salient poles protruding radially from an axial core portion of said armature core, said method comprising the steps of:

winding three wires in two stages around three salient poles respectively, said three salient poles being included into a first block;

said salient poles in the first block disposed substantially at respective trisections of 360°;

drawing out three transition wires from said three salient poles of said first block, respectively in such a manner that each transition wire is drawn out at one surface side of said salient poles;

extending said transition wires in such a manner that said transition wires pass over two adjoining salient poles;

winding said transition wires around salient poles of a second block, respectively, each salient pole of said second block corresponding to each salient pole of said first block; and repeating said winding, drawing out, extending and winding steps until said transition wires completely wind around said salient poles; wherein when said three transition wires are drawn out from said three salient poles, respectively, each of said transition wires being extended on a drawing out surface side of said transition wires at a salient pole directly adjoining said salient pole having said wire completely wound around said salient pole, said transition wire being further extended on an opposite surface to said drawing out surface at a salient pole adjoining said salient pole which directly adjoins said salient pole completely wound, and said transition wire being wound around salient pole of said second block at said drawing out surface.

9. An armature core wire winding method in which an armature core has salient poles set to be an integral multiple number of three, said salient poles protruding radially from an axial core portion of said armature core, each said salient pole corresponding to three systems, said method comprising the steps of:

winding wire in two stages around a salient pole, said salient pole being included into a first system;

drawing out said transition wire from said salient pole of a first system, in such a manner that transition wire is drawn out at one surface side of said salient poles;

extending said transition wire in such a manner that said transition wire passes over two adjoining salient poles;

winding said transition wire around salient pole of a second block, said salient pole of said first and second blocks being in said first system;

repeating said winding, drawing out, extending and winding steps until said transition wire completely winds around said salient poles of said first system; and repeating said winding, drawing out, extending, winding and repeating steps until said transition wire is completely wound around said salient poles of each system; wherein when transition wires is drawn out from said salient pole of each of said systems, said transition wire being extended on an opposite surface to a drawing out surface side of said transition wires at a salient pole directly adjoining said salient pole having said wire completely wound around said salient pole, said transition wire being further extended on said drawing out surface at a salient pole adjoining said salient pole which directly adjoins said salient pole completely wound, and said transition wire being wound around a salient pole of said second block at said drawing out surface.

10. An armature core wire winding method in which an armature core has salient poles set to be an integral multiple number of three, said salient poles protruding radially from an axial core portion of said armature core, each said salient pole corresponding to three systems, said method comprising the steps of:

winding wire in two stages around a salient pole, said salient pole being included into a first system;

drawing out said transition wire from said salient pole of a first system, in such a manner that transition wire is drawn out at one surface side of said salient poles;

extending said transition wire in such a manner that said transition wire passes over two adjoining salient poles;

winding said transition wire around salient pole of a second block, said salient pole of said first and second blocks being in said first system;

repeating said winding, drawing out, extending and winding steps until said transition wire completely winds around said salient poles of said first system; and repeating said winding, drawing out, extending, winding and repeating steps until said transition wire is completely wound around said salient poles of each system; wherein when said three transition wires are drawn out from said salient pole of each of said systems said transition wire being extended on a drawing out surface side of said transition wires at a salient pole directly adjoining said salient pole having said core completely wound around said salient pole, said transition wire being further extended on an opposite surface to said drawing out surface at a salient pole adjoining said salient pole which directly adjoins said salient pole completely wound, and said transition wire being wound around a salient pole of said second block at said drawing out surface.

11. An armature core wire winding method in which an armature core has salient poles set to be an integral multiple number of three, said salient poles protruding radially from an axial core portion of said armature core, each said salient pole corresponding to three systems, said method comprising the steps of:

winding wire in two stages around a salient pole, said salient pole being included into a first system;

drawing out said transition wire from said salient pole of a first system, in such a manner that transition wire is drawn out at one surface side of said salient poles;

extending said transition wire in such a manner that said transition wire passes over two adjoining salient poles;

winding said transition wire around salient pole of a second block, said salient pole of said first and second blocks being in said first system;

repeating said winding, drawing out, extending and winding steps until said transition wire completely winds around said salient poles of said first system; and repeating said winding, drawing out, extending, winding and repeating steps until said transition wire is completely wound around said salient poles of each system; wherein when said transition wire is wound around salient poles of the other systems, said transition wire being cut after said transition wire is completely wound around said salient poles of said first system.

12. An armature core wire winding method in which an armature core has salient poles set to be an integral multiple number of three, said salient poles protruding radially from an axial core portion of said armature core, each said salient pole corresponding to three systems, said method comprising the steps of:

winding wire in two stages around a salient pole, said salient pole being included into a first system;

drawing out said transition wire from said salient pole of a first system, in such a manner that transition wire is drawn out at one surface side of said salient poles;

extending said transition wire in such a manner that said transition wire passes over two adjoining salient poles;

winding said transition wire around salient pole of a second block, said salient pole of said first and second blocks being in said first system;

repeating said winding, drawing out, extending and winding steps until said transition wire completely winds around said salient poles of said first system; and repeating said winding, drawing out, extending, winding and repeating steps until said transition wire is completely wound around said salient poles of each system; wherein after each transition wire is wound around said salient poles of said first system, said transition wire being wound around salient poles corresponding to another system with said transition wire being held by a holding member to connect said three systems with another, when said transition wire is completely wound around said salient pole corresponding to said one of said three systems, said transition wire being cut at said holding member.

* * * * *